Patented Jan. 17, 1933

1,894,682

UNITED STATES PATENT OFFICE

FRANK HAAS, OF PHILADELPHIA, PENNSYLVANIA

PROCESS OF PREVENTING CLINKER

No Drawing. Application filed July 23, 1929. Serial No. 380,465.

This invention relates to a process by means of which solid fuel, such as coal or coke, for example, can be burned in beds without the formation of clinker.

Heretofore, attempts have been made to prevent the formation of clinker on beds of burning coal by throwing certain mineral materials of high temperature melting points into the fire box over the fuel bed. Such attempts have not been successful, largely due to the fact that the mineral does not come into contact with the ash particles at the right time. Clinker forms in spite of the added material, because ash fuses and agglomerates. This clogs up the air passages, causing trouble and expense to remove the clinker and other attendant undesirable effects.

By the present invention, coal or coke can be burned and clinker troubles avoided, either in gas producers or metallurgical furnaces or stoker fire boiler furnaces. In carrying out this invention fine particles of high fusing temperature material are introduced into the furnace in suspension in the combustion air supplied to the furnace below the bed of fuel. The particles pass upwardly through the fuel bed coming into contact with ash particles as they are liberated from the burning fuel, so that the mineral particles introduced with the combustion air modify the ash in such a manner as to avoid clinker troubles.

It is well known that in many coals the ash forming substances may be divided into two groups, one of which includes silica, alumina and alkalis, which are considered to be infusible at the temperatures and under the conditions usually existing in fire boxes, and another group including oxides or sulphate of iron, lime and magnesia, which, although they themselves are not individually fusible at the temperatures and conditions usually existing in fire boxes, are fluxes which will combine with silica and alumina to form compositions that will fuse and agglomerate to form clinker. Clinker troubles usually do not arise when the second group of ash forming substances constitute only a small percentage of the total. It is also known that, if the percentage of the second group of ash forming substances is sufficiently large, the fusibility of the ash will be sufficiently high to prevent clinker trouble under the usual conditions. There is, however, a certain range of percentage of the two groups of ash forming materials in which the fusion point of the mixture is sufficiently low to cause clinker to form and give trouble.

In carrying out the present invention, the mineral substances in finely divided condition that are introduced with the combustion air are so selected that they increase the fusion point of the ash sufficiently to prevent the particles from fusing and agglomerating so as to form a clinker when the mass cools. The amount and nature of the material that is introduced with the combustion air depends upon the sort of ash forming substances that are in the fuel that is being burned.

The following is given as a specific example of carrying out the process upon coal that has ash of a certain analysis, but is to be understood that the invention is not restricted to the particular material that is introduced with the combustion air, as this material will depend upon the ash in the coal or coke that is being burned:

Coal having an ash content of approximately 8% gives trouble by clinkering when it has the following composition: silica, $SiO_2$, 42.11 parts; alumina, $Al_2O_3$, 31.17 parts; iron oxide, $Fe_2O_3$, 19.30 parts; lime, $CaO$, 2.54 parts; magnesia, $MgO$, .56 parts; soda $N_2O$, .87 parts; potash, $K_2O$, 1.32 parts; phosphoric oxide, $P_2O_5$, 1.53 parts; sulphur trioxide, $SO_3$, 1.12 parts.

A sufficient amount of ground quartz is introduced into the combustion air for the coal described above to constitute one per cent of the total weight of the coal. This gives an ash which analyzes as follows: $SiO_2$, 48.31 parts; $Al_2O_3$, 27.57 parts; $Fe_2O_3$, 17.07 parts; $CaO$, 2.25 parts; $MgO$, .50 parts; $N_2O$, .76 parts; $K_2O$, 1.19 parts, $P_2O_5$, 1.35 parts; $SO_3$, 1.00 parts.

The addition of the quartz increases the fusion temperature of the final ash from about 2400° F. to 2700° F., which prevents the particles from fusing and agglomerating to form the clinker.

I claim:—

1. The process of preventing clinker from forming in a bed of coal or coke that is being burned, which comprises mixing fine particles of mineral material with the incoming combustion air, said particles being of such character and amount as will increase the melting point of the total ash.

2. The process of preventing clinker from forming in a bed of coal or coke that is being burned, which comprises mixing fine particles of mineral material with the incoming combustion air, said particles being of such character and amount as will increase the melting point of the total ash and causing the mixture of air and mineral particles to pass upwardly through the bed.

3. The process which comprises introducing particles of mineral material into the combustion air that is used in burning coal or coke in a bed to minimize the formation of clinker, said particles being of such character and amount as will increase the melting point of the total ash.

4. The process which comprises introducing particles of mineral material continuously into the combustion air that is used in burning coal or coke in a bed to minimize the formation of clinker, said particles being of such character and amount as will increase the melting point of the total ash.

5. The process which comprises introducing particles of mineral material into the combustion air that is used in burning coal or coke in a bed to minimize the formation of clinker, said mineral material being infusible at the temperatures in said bed.

6. The process which comprises introducing particles of quartz into the combustion air that is used in burning coal or coke in a bed to minimize the formation of clinker.

7. The process which comprises introducing particles of quartz into the combustion air that is used in burning coal or coke in a bed to minimize the formation of clinker, the weight of the quartz being approximately one per cent of the weight of the fuel burned.

8. The process which comprises introducing fine particles of such mineral material into the combustion air used for burning coal or coke in a bed as will increase the fusing temperature of the ash and prevent the same from agglomerating in large masses.

FRANK HAAS.